J. S. HARBER.
INNER TUBE VALVE.
APPLICATION FILED FEB. 29, 1912.
1,061,069.
Patented May 6, 1913.
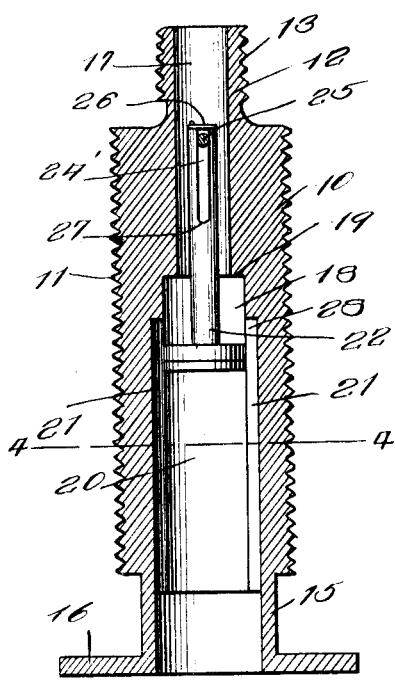
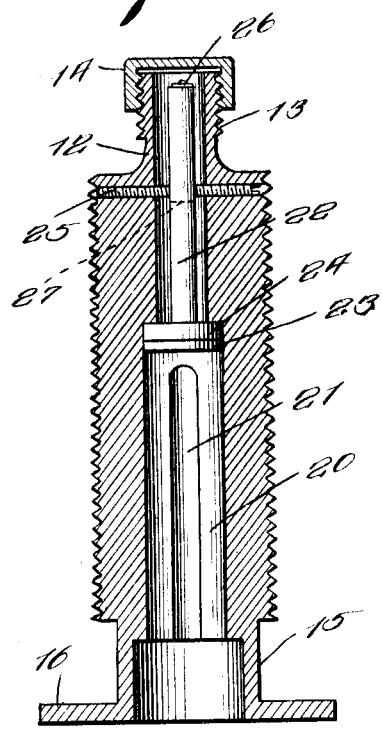
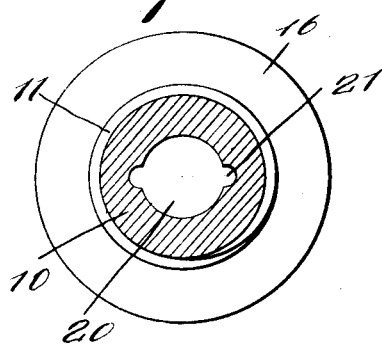
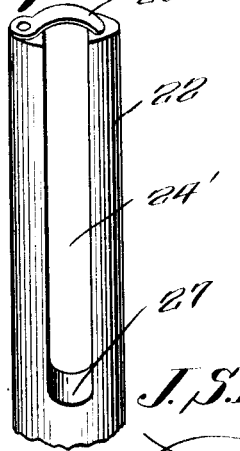
Inventor
J. S. Harber.

UNITED STATES PATENT OFFICE.

JOHN S. HARBER, OF YOUNGSTOWN, OHIO.

INNER-TUBE VALVE.

1,061,069. Specification of Letters Patent. Patented May 6, 1913.

Application filed February 29, 1912. Serial No. 680,571.

*To all whom it may concern:*

Be it known that I, JOHN S. HARBER, a citizen of the United States, residing at Youngstown, in the county of Mahoning, State of Ohio, have invented certain new and useful Improvements in Inner-Tube Valves; and I do hereby declare the following to be a full, clear, and exact description of the invention, such as will enable others skilled in the art to which it appertains to make and use the same.

This invention relates to valves and more especially to a valve adapted for use in connection with pneumatic tires for inflating the inner tubes thereof.

The primary object of the invention is to construct a simple and efficiently operated valve which obviates the necessity of forming springs for moving the valve to a closed position and permitting it to move to an open position when inflating the tire or tube.

With the above and other objects in view, the invention consists in the construction, combinations and arrangements of parts as will be hereinafter more fully described, claimed and illustrated in the accompanying drawings, in which:

Figure 1 is an enlarged sectional view of my improved valve in position for forcing air therethrough when inflating a tube or tire. Fig. 2 is a similar view but showing the valve in a closed position, and at right angles to Fig. 1. Fig. 3 is a detail perspective view of a plunger employed with the device. Fig. 4 is a sectional view on the line 4—4 of Fig. 1.

Referring more specifically to the drawings, wherein like reference characters designate similar parts throughout the several views, the numeral 10 designates the valve tube or casing which is exteriorly threaded as shown at 11 and provided with a reduced upper or outer end 12 which is also exteriorly threaded as shown at 13 for engagement by a closing cap 14 which is fitted on the tube after the tire or inner tube thereof is inflated. The inner end of the tube 10 or casing of the valve is reduced in diameter as shown at 15 and provided with an enlarged valve base 16 which serves to retain the valve within the tire rim after being securely engaged therewith and through the same.

The upper portion of the tube or casing 10 is provided with a non-threaded bore 17 which is enlarged as shown at 18 to provide a surrounding shoulder 19 forming a valve seat for a purpose to be hereinafter made apparent, said seat being located at a point removed from the center of the tube 10 near its outer end while the inner end of the tube is provided with a further enlarged bore 20 also non-threaded and formed with two diametrically opposite longitudinal grooves 21 through which the air is fed into the tire or tube to be inflated in a manner to be hereinafter made apparent. It is of course understood that the bore 20 or the portion of the bore is of similar diameter as the portion 18 and in carrying out my invention, I provide a valve stem 22 which is considerably smaller in diameter than the portion 17 of the bore of the tube or casing 10 and carries an enlarged metallic valve head or plunger 23 which is formed of metal and which is contacted by a relatively thick rubber washer 24 which is adapted to engage the shoulder 19 to prevent the escape of air after the tire is inflated. The valve head operates between the enlarged portions 19 and 20 of the bore of the valve tube or casing 10 being snugly fitted therein and having the upper end of its stem 22 formed with a longitudinal slot 24' which is slidably engaged over a transverse retaining screw 25 threaded through the enlarged portion 12 of the tube 10 serving to guide the said valves during its operative movement.

The upper end of the stem 22 carries a pivoted catch member 26 which when moved to close the slot 24 prevents displacement of the valve inwardly while the end wall 27 of the slot 24' limits the outward displacement of the valve in contact with the shoulder 19, sufficient play being allowed to permit proper seating of the valve. It will thus be seen that when it is desired to inflate an inner tube or tire, the cap 14 is removed and a pump connected with the thread 13 and operated, air being forced through the bore 17 and moving the valve 14 inwardly beyond the inlet portion of the feed slots 21 indicated by the numeral 28 as shown in Fig. 1 of the drawings, thus permitting the air to pass beyond the valve and through the slots 21 and consequently into the tire or tube. When the tire or tube is inflated to the desired degree, the pump is removed, thus relieving head pressure from the valve and permitting the air within the tire or tube to act upon the valve to force it into contact with the shoulder 19 guided by the engagement of the pin 25 within the slot 24 so as to prevent escape of the air. It will thus be seen that the air fed to the tire or tube which is inflated operates to automatically open the feed valve and when the supply means or pump is removed, the said valve will automatically move to a closed position and prevent the escape of the air, thereby avoiding the necessity of employing springs which complicate the structure and often get out of order.

The valve and its stem 22 are fitted within the tube or casing 10 from its inner end and the catch 26 prevents it from dropping out of place.

I claim:

A valve of the class described comprising a casing adapted for attachment to a wheel rim, said casing having one end open and provided with a counter-bore, the main bore of the casing terminating at a point intermediate of the ends of the casing, and the casing being provided with a reduced bore extending from the inner end of the main bore to the end of the casing, the face of the main bore being provided with a plurality of feed grooves, a valve having a cushion head and a stem slidable in the reduced bore, the inner end of the main bore forming a valve seat, the upper end of the valve stem being slotted, a transverse retaining member engaged in the wall of the casing and passing through said slot and a stop pivoted to the top of the stem to close the slot and thus prevent displacement of the valve when air is forced inwardly through the same.

In testimony whereof, I affix my signature, in presence of two witnesses.

JOHN S. HARBER.

Witnesses:
E. W. BURRELL,
W. R. STEWART.